(12) United States Patent
Hira et al.

(10) Patent No.: US 10,897,453 B2
(45) Date of Patent: Jan. 19, 2021

(54) PROVIDING NETWORKING AND SECURITY TO WORKLOADS VIA A CONTROL VIRTUAL PRIVATE CLOUD SHARED ACROSS MULTIPLE VIRTUAL PRIVATE CLOUDS

(71) Applicant: Nicira, Inc., Palo Alto, CA (US)

(72) Inventors: Mukesh Hira, Palo Alto, CA (US); Ganesan Chandrashekhar, Campbell, CA (US); Su Wang, Sunnyvale, CA (US); Akshay Katrekar, Mountain View, CA (US); Vivek Agarwal, Campbell, CA (US)

(73) Assignee: Nicira, Inc., Palo Alto, CA (US)

( * ) Notice: Subject to any disclaimer, the term of this patent is extended or adjusted under 35 U.S.C. 154(b) by 210 days.

(21) Appl. No.: 15/881,710

(22) Filed: Jan. 26, 2018

(65) Prior Publication Data

US 2019/0238509 A1    Aug. 1, 2019

(51) Int. Cl.
*G06F 17/00* (2019.01)
*H04L 29/06* (2006.01)
*G06F 9/455* (2018.01)

(52) U.S. Cl.
CPC ...... *H04L 63/0263* (2013.01); *G06F 9/45558* (2013.01); *H04L 63/0227* (2013.01); *H04L 63/0236* (2013.01); *H04L 63/0272* (2013.01); *H04L 63/0281* (2013.01); *H04L 63/164* (2013.01); *H04L 63/20* (2013.01); *G06F 2009/45587* (2013.01)

(58) Field of Classification Search
CPC ............... H04L 63/0263; H04L 63/164; H04L 63/0227; H04L 63/0236; H04L 63/20; H04L 63/0281; H04L 63/0272; G06F 9/45558; G06F 2009/45587
See application file for complete search history.

(56) References Cited

U.S. PATENT DOCUMENTS 9,762,619 B1 *   9/2017  Vaidya ............... G06F 9/455
10,484,334 B1 *  11/2019  Lee ................. H04L 63/0245
(Continued)

FOREIGN PATENT DOCUMENTS

WO      2015071888 A1     5/2015

OTHER PUBLICATIONS

International Search Report dated Apr. 16, 2019 for International Application No. PCT/US2019/015282, filed Jan. 25, 2019.

*Primary Examiner* — Trong H Nguyen
(74) *Attorney, Agent, or Firm* — Patterson + Sheridan LLP

(57) ABSTRACT

The present disclosure generally relates to deploying a proxy control plane and/or north-south data plane in a control virtual private cloud of a logical network implemented on a software-defined datacenter. The control virtual private cloud is shared by a plurality of compute virtual private clouds of the network. In some embodiments, a proxy control plane is deployed on the control virtual private cloud and disseminates policies directly to endpoints of the logical network. In some embodiments, a north-south data plane is deployed on the control virtual private cloud and directly manages north-south network traffic from endpoints of the logical network. In some embodiments, a proxy control plane and a north-south network data plane are deployed on the control virtual private cloud.

22 Claims, 6 Drawing Sheets

(56) References Cited

U.S. PATENT DOCUMENTS

| | | | |
|---|---|---|---|
| 2013/0018999 A1* | 1/2013 | Merrill | H04L 41/5041 |
| | | | 709/223 |
| 2013/0332577 A1* | 12/2013 | Nakil | H04L 41/0659 |
| | | | 709/219 |
| 2015/0139238 A1* | 5/2015 | Pourzandi | H04L 45/42 |
| | | | 370/392 |
| 2015/0195137 A1* | 7/2015 | Kashyap | H04L 41/0893 |
| | | | 370/254 |
| 2015/0263960 A1* | 9/2015 | Kasturi | H04L 47/22 |
| | | | 370/230.1 |
| 2016/0013971 A1* | 1/2016 | Caviglia | H04L 41/06 |
| | | | 370/225 |
| 2017/0099284 A1* | 4/2017 | Balmakhtar | H04W 12/12 |
| 2017/0300552 A1* | 10/2017 | Mandadi | G06F 16/273 |
| 2018/0285166 A1* | 10/2018 | Roy | G06F 9/45558 |

* cited by examiner

PROVIDING NETWORKING AND SECURITY TO WORKLOADS VIA A CONTROL VIRTUAL PRIVATE CLOUD SHARED ACROSS MULTIPLE VIRTUAL PRIVATE CLOUDS

CROSS-REFERENCE TO RELATED APPLICATIONS

This application relates to: U.S. Provisional Application No. 62/380,411, entitled "EXTENSION OF NETWORK CONTROL SYSTEM INTO PUBLIC CLOUD," filed Aug. 27, 2016; U.S. application Ser. No. 15/253,829, entitled "EXTENSION OF NETWORK CONTROL SYSTEM INTO PUBLIC CLOUD," filed Aug. 31, 2016; U.S. application Ser. No. 15/253,832, entitled "MANAGED FORWARDING ELEMENT EXECUTING IN PUBLIC CLOUD DATA COMPUTE NODE WITHOUT OVERLAY NETWORK," filed Aug. 31, 2016; U.S. application Ser. No. 15/253,833, entitled "MANAGED FORWARDING ELEMENT EXECUTING IN PUBLIC CLOUD DATA COMPUTE NODE WITH DIFFERENT INTERNAL AND EXTERNAL NETWORK ADDRESSES," filed Aug. 31, 2016; U.S. application Ser. No. 15/253,834, entitled "MANAGED FORWARDING ELEMENT EXECUTING IN SEPARATE NAMESPACE OF PUBLIC CLOUD DATA COMPUTE NODE THAN WORKLOAD APPLICATION," filed Aug. 31, 2016; U.S. application Ser. No. 15/279,382, entitled "CENTRALIZED PROCESSING OF NORTH-SOUTH TRAFFIC FOR LOGICAL NETWORK IN PUBLIC CLOUD," filed Sep. 28, 2016; U.S. application Ser. No. 15/279,394, entitled "DISTRIBUTED NETWORK ENCRYPTION FOR LOGICAL NETWORK IMPLEMENTED IN PUBLIC CLOUD," filed Sep. 28, 2016; U.S. application Ser. No. 15/279,403, entitled "LOGICAL NETWORK DOMAINS STRETCHED BETWEEN PUBLIC AND PRIVATE DATACENTERS," filed Sep. 28, 2016; U.S. application Ser. No. 15/279,409, entitled "DISTRIBUTED PROCESSING OF NORTH-SOUTH TRAFFIC FOR LOGICAL NETWORK IN PUBLIC CLOUD," filed Sep. 28, 2016; U.S. application Ser. No. 15/369,580, entitled "POLICY DEFINITION AND ENFORCEMENT FOR A NETWORK VIRTUALIZATION PLATFORM," filed Dec. 5, 2016; U.S. application Ser. No. 15/369,596, entitled "MULTI-LAYER POLICY DEFINITION AND ENFORCEMENT FRAMEWORK FOR NETWORK VIRTUALIZATION," filed Dec. 5, 2016, issued as U.S. Pat. No. 9,762,619; U.S. application Ser. No. 15/406,249, entitled "MANAGING NETWORK TRAFFIC IN VIRTUAL SWITCHES BASED ON LOGICAL PORT IDENTIFIERS," filed Jan. 13, 2017; U.S. application Ser. No. 15/831,372, entitled "HIGH AVAILABILITY FOR STATEFUL SERVICES IN PUBLIC CLOUD LOGICAL NETWORKS," filed Dec. 4, 2017; and U.S. application Ser. No. 15/831,369, entitled "FAILOVER OF CENTRALIZED ROUTERS IN PUBLIC CLOUD LOGICAL NETWORKS," filed Dec. 4, 2017. The contents of each of these applications are hereby incorporated by reference in their entireties.

FIELD

The present disclosure relates generally to logical networks, and more specifically to implementing a hierarchical logical network that deploys a control virtual private cloud shared across multiple compute virtual private clouds.

BACKGROUND

An increasing number of users (e.g., organizations, companies) are moving their networks to the cloud, which is built on datacenters. The network may encompass a private datacenter and a public datacenter, or a combination of several private and/or public datacenters. A software-defined datacenter enables an administrator of the network to more easily manage the network running on several datacenters by providing a software overlay such that the network running on several datacenters can be viewed, from the perspective of the administrator, as one concentrated system—a logical network.

As with any network, a logical network may encompass numerous host computing systems, each deploying one or more virtual machines, that are spread throughout the datacenter composing the software-defined datacenter. In one example, a virtual private cloud (VPC) may be created for a tenant of a datacenter. A VPC is a logically isolated set of resources of the datacenter over which the tenant has control. In certain aspects, the set of resources may be provided by one or more host computing systems. To enforce network policies (e.g., security policies, routing policies, enforcement policies) throughout endpoints of the logical networks, each host computing system and/or each virtual private cloud may locally operate a proxy control plane that manages forwarding of network policy rules within its respective host computing system and/or virtual private cloud.

However, locally operating a proxy control plane for each host computing system and/or virtual private cloud can be a computing resource-intensive and expensive task (e.g., because a control plane may be operated by a cluster of virtual machines and/or operating control planes may require specialized hardware, different from hardware that operate workload virtual machines). This issue is increasingly magnified based on the network's size—the larger number of host computing systems and/or virtual private clouds there are in the network, the more computing resource-intensive and expensive it becomes for the network administrator to operate the logical network. Thus, operating the logical network using tradition techniques becomes burdensome to the network administrator.

OVERVIEW

The invention disclosed herein is directed to implementing a hierarchical logical network, operating on a software-defined datacenter, that deploys a proxy control plane and/or a north-south data plane in a control virtual private cloud shared by a plurality of compute virtual private clouds of the logical network.

In some embodiments, a method for enforcing policies (e.g., security policies, routing policies, enforcement policies) on virtual machines across virtual private clouds using a control virtual private cloud (e.g., of a logical network implemented on a software-defined datacenter). The method comprises, at the control virtual private cloud (e.g., of a public datacenter of the software defined datacenter) that includes a proxy control plane, where the proxy control plane is directly in communication with at least a first virtual machine of a first (compute) virtual private cloud and a second virtual machine of a second (compute) virtual private cloud, receiving a policy and directly transmitting, without passing an intermediary proxy control plane local to the first (compute) virtual private cloud or to the second (compute) virtual private cloud, a first rule of the policy to the first virtual machine and a second rule of the policy to the second virtual machine. The method further comprises, at the first virtual machine of the first (compute) virtual private cloud, receiving the first rule from the proxy control plane of the control virtual private cloud and enforcing (via a first local control plane agent) the first rule at the first virtual machine. The method further comprises, at the second virtual machine of the second (compute) virtual private cloud, receiving the second rule from the proxy control plane of the control virtual private cloud and enforcing (via a second local control plane agent) the second rule at the second virtual machine.

In some embodiments, one or more non-transitory (and/or transitory) computer-readable storage medium (which optionally includes one or more modules, programs, and/or set of instructions for performing multiple functions) storing one or more programs configured to be executed by one or more processors to enforce policies (e.g., security policies, routing policies, enforcement policies) on virtual machines across virtual private clouds using a control virtual private cloud (e.g., of a logical network implemented on a software-defined datacenter) is described. The one or more programs further include instructions for carrying out the method at a control virtual private cloud, at a first virtual machine of a first virtual private cloud, and at a second virtual machine of a second virtual private cloud, as described above.

In some embodiments, a system (which optionally includes memory and one or more modules, programs, and/or set of instructions in the memory for performing multiple functions) for enforcing policies (e.g., security policies, routing policies, enforcement policies) on virtual machines across virtual private clouds using a control virtual private cloud (e.g., of a logical network implemented on a software-defined datacenter) is described. The system comprises a control virtual private cloud, a first virtual machine of a first virtual private cloud, and a second virtual machine of a second virtual private cloud configured to carry out the method, as described above.

BRIEF DESCRIPTION OF THE DRAWINGS

The following description and associated figures teach the best mode of the inventions. Thus, those skilled in the art will appreciate variations from the best mode that fall within the scope of the inventions. Those skilled in the art will appreciate that the features described below can be combined in various ways to form multiple variations of the inventions. As a result, the inventions are not limited to the specific examples described below, but only by the claims and their equivalents.

DETAILED DESCRIPTION

Figure 1:
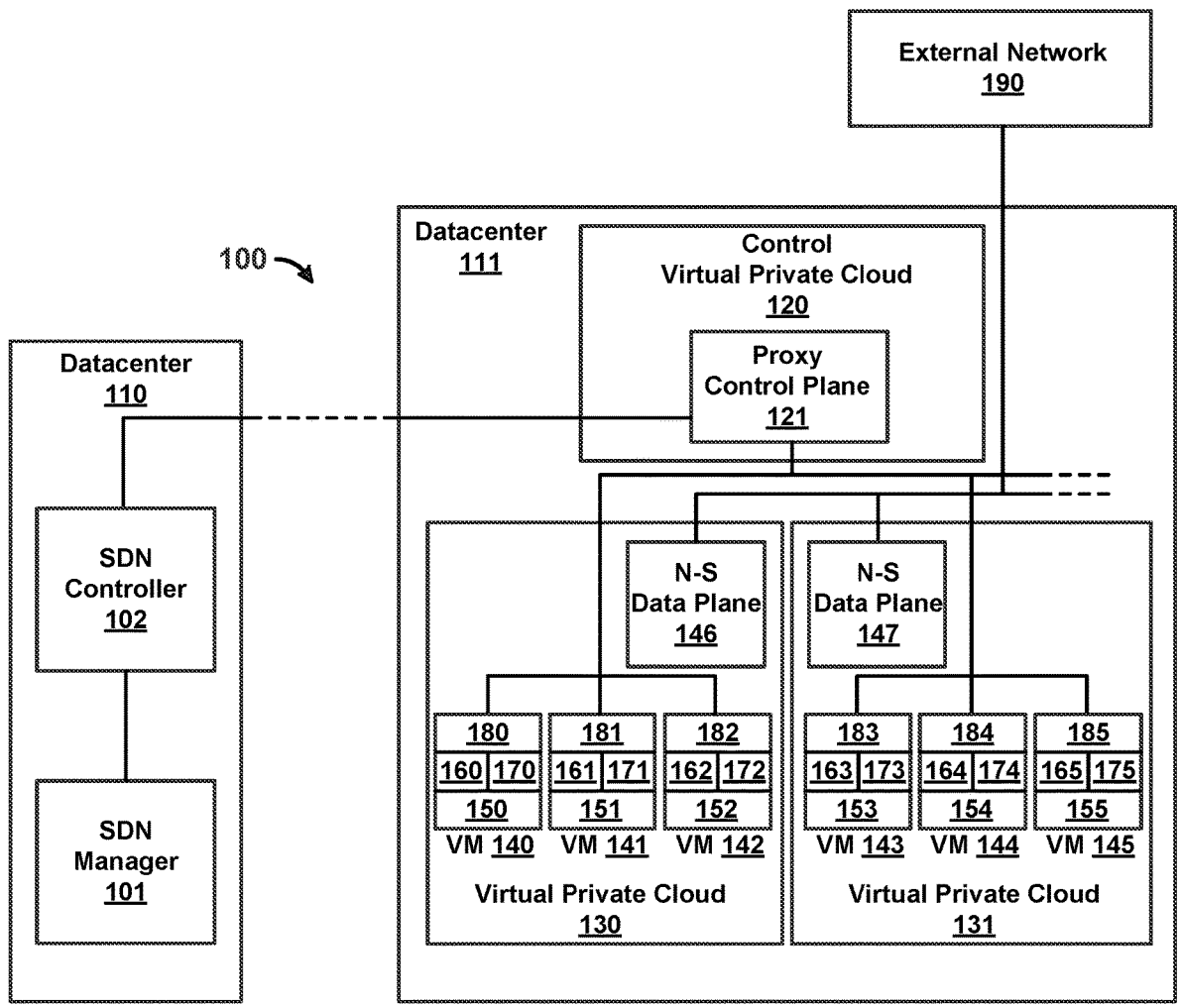
FIG. 1 illustrates an exemplary logical network deploying a proxy control plane in a control virtual private cloud.

The invention disclosed herein is directed to embodiments for implementing a hierarchical logical network, also referred to as a software-defined network (SDN), that includes a proxy control plane and/or a north-south data plane in a control virtual private cloud (e.g., a shared virtual private cloud) that is shared by a plurality of compute virtual private clouds of the logical network and acts as a central control gateway to the plurality of compute virtual private clouds.

In some embodiments, the logical network operates on a software-defined datacenter. That is, the logical network spans across a private datacenter, in which the system can access and control the forwarding elements, and/or one or more public multi-tenant datacenters in which the system does not have access to the forwarding elements. Further, the one or more public cloud datacenters may be of the same cloud service provider or of different cloud service providers.

A typical datacenter (whether public or private) includes a plurality of host computing systems that are each powered by one or more processors and that each includes memory. Memory may include one or more computer-readable storage media. The one or more computer-readable storage media may be tangible and non-transitory, and/or may be transitory. Memory may include high-speed random access memory and may also include non-volatile memory (e.g., one or more flash storage devices, one or more magnetic disk storage devices, and/or other non-volatile solid-state memory devices). The one or more computer-readable storage media included in memory may store one or more programs comprising instructions. The instructions may be configured to implement (at least a portion of) a logical network.

In some embodiments, the logical network infrastructure further includes a SDN manager (e.g., a management plane) that establishes a set of policy rules (e.g., configured by a network administrator of the owner of the logical network via a network management interface) and a SDN controller that disseminates the policy over the network. The SDN manager and SDN controller may operate on the same private servers (e.g., a private datacenter) of the network administrator or may operate on different datacenters. In some embodiments, the SDN controller disseminates configuration rules (e.g., of a networking and/or security policy) to one or more proxy control planes (e.g., deployed on one or more public datacenters) of the logical network.

In some embodiments, the software-defined datacenter deploying the logical network includes one or more public datacenters, and each public datacenter provides one or more isolated sets of computing resources (e.g., one or more isolated sets of virtual machines) over which the network administrator has control—each set of isolated computing resources provided by a public datacenter is sometimes referred to in the industry as a "virtual private cloud." In some embodiments, the logical network may encompass a plurality of virtual private clouds (e.g., including a control virtual private cloud(s) and a compute virtual private cloud(s)).

In some embodiments, a compute virtual private cloud includes one or more virtual machines (and/or one or more containers) that run workload applications. In some embodiments, a control virtual private cloud (also referred to as a shared virtual private cloud) is shared by the one or more virtual machines (and/or more containers) of a plurality of compute virtual private clouds of the logical network. In some embodiments, the control virtual private cloud includes a cloud plugin configured to communicate with an application programming interface of a (third-party) cloud service provider of its respective public datacenter.

In some embodiments, a virtual private cloud (whether it is a shared virtual private cloud or a compute virtual private cloud) includes a proxy control plane which is implemented by a single virtual machine or a cluster of virtual machines of its respective virtual private cloud. In some embodiments, a proxy control plane receives configuration rules (e.g., of a networking and/or security policy) from the SDN controller and further disseminates the rules to its respective virtual machines (and/or containers). In some embodiments, a proxy control plane (whether in a shared virtual private cloud or a compute virtual private cloud) can be horizontally scaled out to multiple (or additional) virtual machines. Scaling out the proxy control plane to cover multiple virtual machines or a cluster of virtual machines helps to alleviate network load on the proxy control plane. This technique, which is referred to as "sharding," is described (e.g., with reference to a data plane) in greater detail in incorporated applications U.S. application Ser. No. 15/831,372 and U.S. application Ser. No. 15/831,369.

In some embodiments, a virtual private cloud (whether it is a shared virtual private cloud or a compute virtual private cloud) also includes a north-south data plane which is implemented by a single virtual machine or a cluster of virtual machines of its respective virtual private cloud. In some embodiments, a north-south data plane acts as a gateway for its respective virtual private cloud—all of the north-sound traffic of a virtual private cloud passes through its respective north-south data plane. In some embodiments, as with a proxy control plane, a north-south data plane (whether in a shared virtual private cloud or a compute virtual private cloud) can be horizontally scaled out to multiple (or additional) virtual machines. As with a virtual machine(s) implementing a proxy control plane, sharding the north-south data plane can help alleviate network load on the north-south data plane. As mentioned, sharding a data plane is described in greater detail in incorporated applications U.S. application Ser. No. 15/831,372 and U.S. application Ser. No. 15/831,369.

In some embodiments, the logical network infrastructure further includes network controllers (e.g., local control plane agents) and managed forwarding elements inside virtual machines (and/or inside containers) of compute virtual private clouds to enforce network security and forwarding rules for packets communicated between virtual machines (and/or between containers).

As described in greater detail below, the techniques described herein address disadvantages of deploying a proxy control plane and/or a north-south data plane locally on each compute virtual private cloud (deployed on one or more public datacenters) of a logical network by instead deploying one or more proxy control planes in a control virtual private cloud (e.g., a shared virtual private cloud), and/or one or more north-south data planes in the control virtual private cloud.

FIG. 1 illustrates an exemplary logical network 100 deploying a proxy control plane in a control virtual private cloud (e.g., a shared virtual private cloud), in accordance with some embodiments. An example operational scenario of distributing configuration rules (e.g., of a networking and/or security policy) over logical network 100 deploying a proxy control plane in a control virtual private cloud is described with reference to blocks 210-250 of flow diagram 200 of FIG. 2. In some embodiments, logical network 100 is deployed on a software-defined datacenter, where the software-defined datacenter includes at least a private datacenter 110 and a public datacenter 111. In some embodiments, the software-defined datacenter optionally further encompasses one or more additional datacenters (not shown) within its purview. In some embodiments, the software-defined datacenter encompasses only one or more additional public datacenters.

Logical network 100 includes, within public datacenter 111, a first virtual private cloud 130 (e.g., a compute virtual private cloud) and a second virtual private cloud 131 (e.g., a compute virtual private cloud). In some embodiments, logical network 100 further includes one or more additional compute virtual private clouds (not shown). The one or more additional compute virtual clouds may be deployed in public datacenter 111 and/or in a different datacenter.

Logical network 100 further includes, deployed in datacenter 110 (e.g., a private datacenter), a SDN controller 102 controlled by a SDN manager 101. SDN manager 101 establishes a set of policy rules (e.g., security rules, routing rules, forwarding rules, enforcement rules), which may be configured by a network administrator of the owner of logical network 100 via a network management interface, and forwards the policy rules to SDN controller 102 for disbursement over the network. Upon receiving the policy rules, SDN controller 102 transmits the policy rules to first level network controllers (e.g., a control virtual private cloud that operates as a central control gateway) across the network.

First virtual private cloud 130 locally includes a north-south data plane 146 and a plurality of virtual machines (connected to north-south data plane 146), including virtual machines 140-142. North-south data plane 146 may be a single virtual machine of first virtual private cloud 130 or a cluster of virtual machines of first virtual private cloud 130. Similarly, second virtual private cloud 131 locally includes a north-south data plane 147 and a plurality of virtual machines (connected to north-south data plane 147), including virtual machines 143-145. In some embodiments, first virtual private cloud 130 and/or second virtual private cloud 131 includes one or more containers also connected to its respective north-south data plane. In some embodiments, north-south data planes 146 and 147 are each connected to an external network 190.

In some embodiments, each virtual machine (and/or each container) of logical network 100 operates a workload application (e.g., an application workload, a database workload, a web workload). For example, in logical network 100, virtual machines 140-142 may operate a web workload 150, a database workload 151, and an application workload 152, respectively, and virtual machines 143-145 may operate a web workload 153, an application workload 154, and a database workload 155, respectively.

In some embodiments, each virtual machine of the logical network includes a local control plane agent that controls a managed forwarding element for overseeing outgoing and incoming packets. For example, virtual machines 140-145 each include local control plane agents 160-165, respectively, and managed forwarding elements 170-175, respectively. Each virtual machine of the logical network further includes a virtual network interface for transmitting and receiving packets from the network. For example, in logical network 100, virtual machines 140-145 each include virtual networks interfaces 180-185, respectively.

As shown in FIG. 1, public datacenter 111 also includes a control virtual private cloud 120 in communication with both first virtual private cloud 130 and second virtual private cloud 131. Control virtual private cloud 120 may also be in communication with one or more additional virtual private clouds of the logical network (not shown). Control virtual private cloud 120 operates as a central control gateway to the compute virtual private clouds (e.g., first virtual private cloud 130 and second virtual private cloud 131) of the logical network.

In some embodiments, connectivity between control virtual private cloud 120 and compute virtual private clouds 130 and 131 is provided via peering among the virtual private clouds. In some embodiments, connectivity control virtual private cloud 120 and compute virtual private clouds 130 and 131 is provided via virtual private network (VPN) connections between the virtual private clouds, which may be implemented using virtual appliances instantiated by the tenant or by using VPN services provided by the public cloud provider. In some embodiments, connectivity between control virtual private cloud 120 and compute virtual private clouds 130 and 131 is provided by any other inter-virtual private cloud connectivity mechanism supported by the cloud service provider of datacenter 111.

As also shown in FIG. 1, control virtual private cloud 120 includes a proxy control plane 121 connected to virtual machines 140-142 of first virtual private cloud 130 and virtual machines 143-145 of second virtual private cloud 131 and configured to provide configuration rules (e.g., of a networking and/or security policy) to virtual machines 140-142 and virtual machines 143-145. In this implementation, neither first virtual private cloud 130 nor second virtual private cloud 131 locally deploys a proxy control plane. In some embodiments, in addition to proxy control plane 121, control virtual private cloud 120 includes one or more additional proxy control planes as standby proxy control planes.

Figure 2:
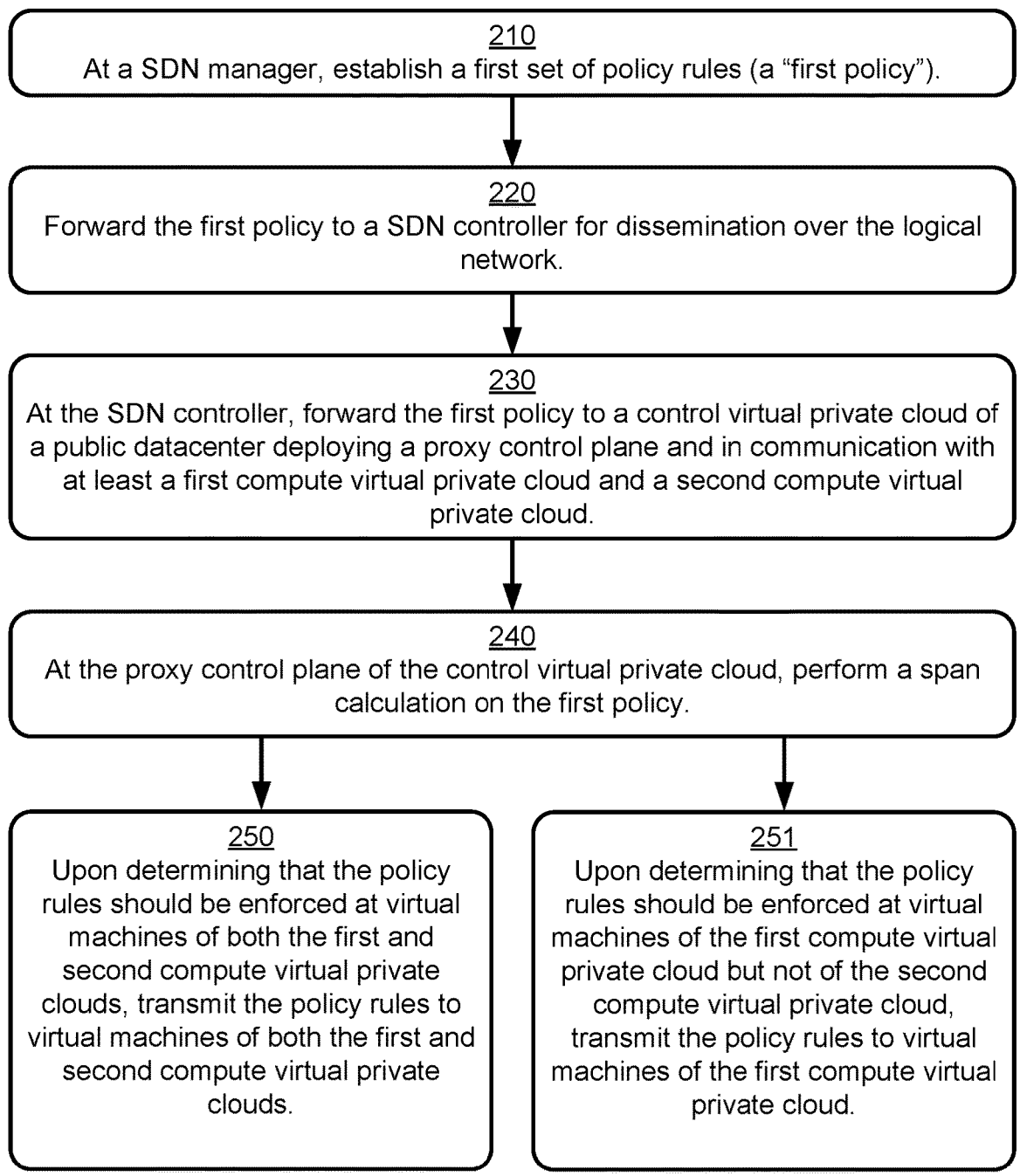
FIG. 2 illustrates an example operational scenario of distributing configuration rules over a logical network deploying a proxy control plane in a control virtual private cloud.

Referring to FIG. 2, at block 210, SDN manager 101 establishes a first set of configuration rules (e.g., configured by a network administrator of the owner of logical network 100 via a network management interface), referred to herein as a "first policy." The first policy is, for example, a unified global security policy. At block 220, SDN manager 101 forwards the first policy to SDN controller 102 for distribution over the logical network.

In some embodiments, prior to distributing the policy, SDN controller 102 determines, based on the rules of the policy (e.g., by performing a span calculation), which first level network controllers (e.g., which central control gateway(s), if the network is deploying a plurality of central control gateways) should receive the policy rules. In logical network 100, a single central control gateway (control virtual private cloud 120) is deployed. Thus, at block 230, SDN controller 102 transmits the first policy to control virtual private cloud 120 of public datacenter 111.

At block 240, upon receiving the first policy, proxy control plane 121 of control virtual private cloud 120 performs a span calculation on the received policy rules to determine the endpoints (e.g., virtual machines 140-142, virtual machines 143-145) of the logical network upon which to enforce the policy rules. In some embodiments, the endpoints are one or more virtual machines and/or one or more containers of the compute virtual private clouds of the logical network.

At block 250, upon determining, based on the policy rules, that the policy should be enforced at virtual machines of first virtual private cloud 130 and of second virtual private cloud 131, proxy control plane 121 transmits the policy rules to virtual machines 140-142 of first virtual private cloud 130 and virtual machines 143-145 of second virtual private cloud 131. In some embodiments, at each virtual machine, a local control plane agent then configures a respective managed forwarding element to enforce the policy rules at its respective virtual machine.

Instead, at block 251, upon determining, based on the policy rules, that the policy should be enforced at virtual machines of first virtual private cloud 130 but not at virtual machines of second virtual private cloud 131, proxy control plane 121 transmits the policy rules to virtual machines 140-142 of first virtual private cloud 130 for enforcement but not to virtual machines 143-145 of second virtual private cloud 131.

As described above with reference to Flow Diagram 200 of FIG. 2, in some embodiments, all of the workloads of a logical network (e.g., workloads of virtual machines 140-142 and of virtual machines 143-145) connect to a shared proxy control plane (e.g., proxy control plane 121) in a control virtual private cloud, instead of locally to a proxy control plane within a workload virtual machine's (or workload container's) respective virtual private cloud, to receive policy rules from SDN controller 102.

Utilizing a shared proxy control plane in a control virtual private cloud (operating as a central control gateway) to distribute policy rules to endpoints of the logical network reduces the amount of host computing resources required to operate the logical network (e.g., by operating fewer virtual machines), which reduces the technological management and financial burdens for an owner of the logical network to maintain use of the logical network over one or more public datacenters provided by a cloud service provider(s).

As mentioned, the software-defined datacenter deploying logical network 100 optionally includes one or more additional compute virtual private clouds in the same or different datacenter(s). In some embodiments, the software-defined datacenter includes a third compute virtual private cloud that operates on a second public datacenter different from public datacenter 111, but which is in the same geographic region as public datacenter 111 (e.g., a U.S. west region). In some embodiments, the third virtual private cloud, as with first virtual private cloud 130 and second virtual private cloud 131, is peered to control virtual private cloud 120 of public datacenter 111, and workloads (of virtual machines and/or containers) of the third virtual private cloud receive policy rules directly from proxy control plane 121 of control virtual private cloud 120.

Figure 3:
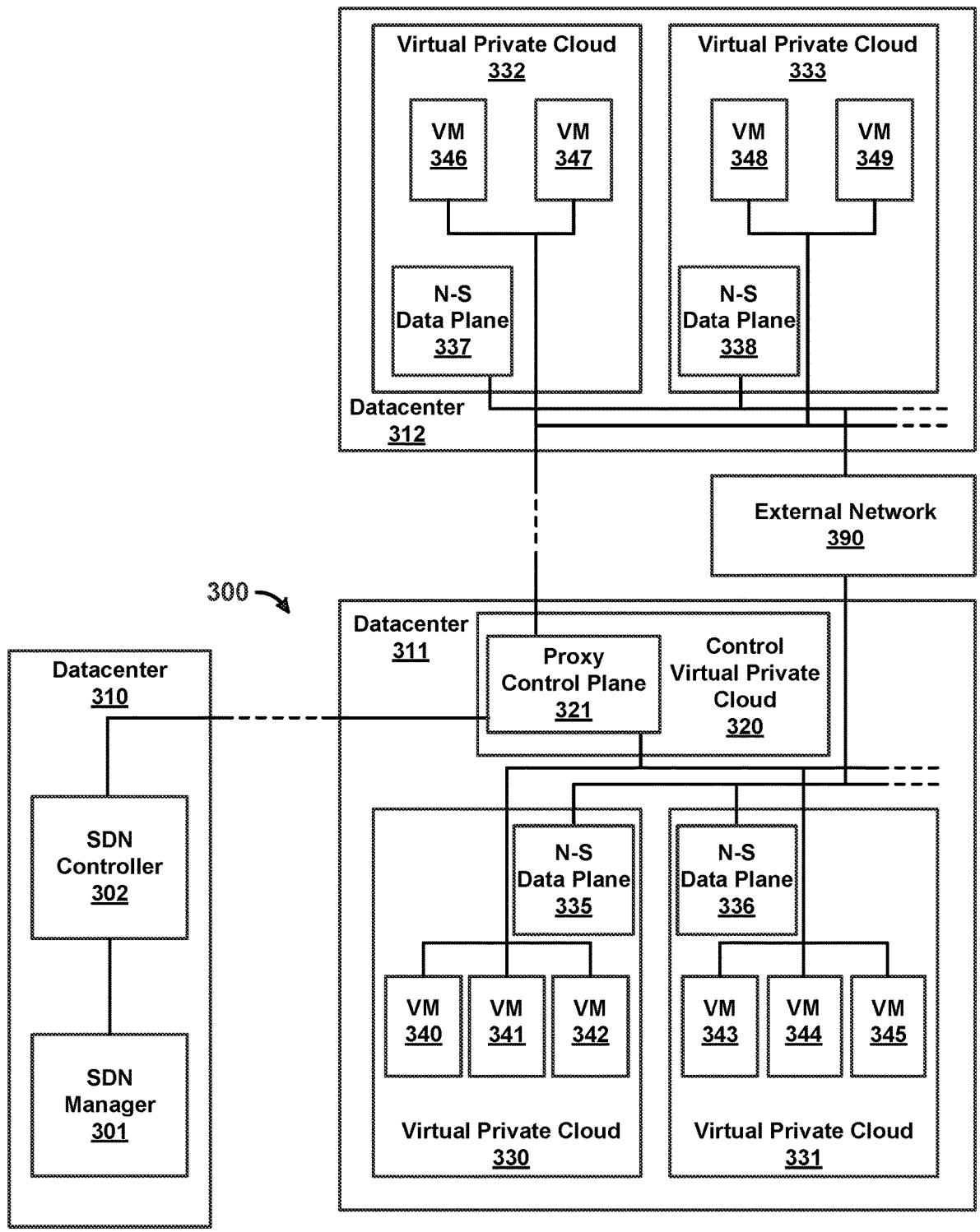
FIG. 3 illustrates an exemplary logical network deploying a proxy control plane in a control virtual private cloud that manages workloads across datacenters in different regions.

In some situations, however, a public datacenter encompassed by a logical network may be in a different geographic region from another public datacenter encompassed by the logical network (e.g., one datacenter may be in a U.S. west region and a different datacenter may be in a U.S. east region). FIG. 3 illustrates an exemplary logical network 300 implemented on a software-defined datacenter that deploys a proxy control plane in a control (shared) virtual private cloud which manages workloads across datacenters of different geographical regions, in accordance with some embodiments.

As shown in FIG. 3, the software-defined datacenter of logical network 300 includes a private datacenter 310 deploying a SDN manager 301 (which establishes the policy rules) and a SDN controller 302 (which distributes the policy rules over the network). The software-defined datacenter of logical network 300 also includes a first public datacenter 311 and a second public datacenter 312, where second public datacenter 312 is in a different geographic region from first public datacenter 311 (e.g., first public datacenter 311 is in the U.S. west region and second public datacenter 312 is in the U.S. east region).

First public datacenter 311 includes a control virtual private cloud 320 (a shared virtual private cloud) that deploys a proxy control plane 321. Proxy control plane 321 may be a single virtual machine or a cluster of virtual machines belonging to the isolated set of computing resources operating control virtual private 320.

First public datacenter 311 also includes a first virtual private cloud 330 (a compute virtual private cloud) deploying a north-south data plane 335 and a second virtual private cloud 331 (a compute virtual private cloud) deploying a north-south data plane 336. North-south data plane 335 and north-south data plane 336 may each be a single virtual machine or a cluster of virtual machines belonging to the isolated set of computing resources of its respective virtual private cloud.

In some embodiments, control virtual private cloud 320 is peered to first virtual private cloud 330 and to second virtual private cloud 331—as such, virtual machines 340-342 of first virtual private cloud 330 and virtual machines 343-345 of second virtual private cloud 331 are connected to and (directly) communicate with proxy control plane 321 of control virtual private cloud 320.

Similarly, second public datacenter 312 includes a third virtual private cloud 332 (a compute virtual private cloud) deploying a north-south data plane 337 (e.g., as a single virtual machine or a cluster of virtual machines) and virtual machines 346-347 and a fourth virtual private cloud 333 having a north-south data plane 368 (e.g., as a single virtual machine or a cluster of virtual machines) and virtual machines 348-349. As mentioned, second public datacenter 312 is in a different geographical region from first public datacenter 311.

Because the datacenters are in different geographical regions, neither third virtual private cloud 332 nor fourth virtual private cloud 333 of second public datacenter 312 are peered to control virtual private cloud 320 of first public datacenter 311. In some embodiments, the virtual machines of the virtual private clouds of second public datacenter 312 instead communicate with control virtual private cloud 320 via a virtual private network (VPN) connection. Once a VPN connection is established between a proxy control plane (e.g., proxy control plane 321) of a shared virtual private cloud (e.g., control virtual private cloud 320) and other virtual machines deployed on host systems of a public datacenter in a different geographical region (e.g., virtual machines 346-349), these other virtual machines can (directly) communicate with the proxy control plane (e.g., proxy control plane 321) of the shared virtual private cloud to directly receive policy rules.

Figure 4:
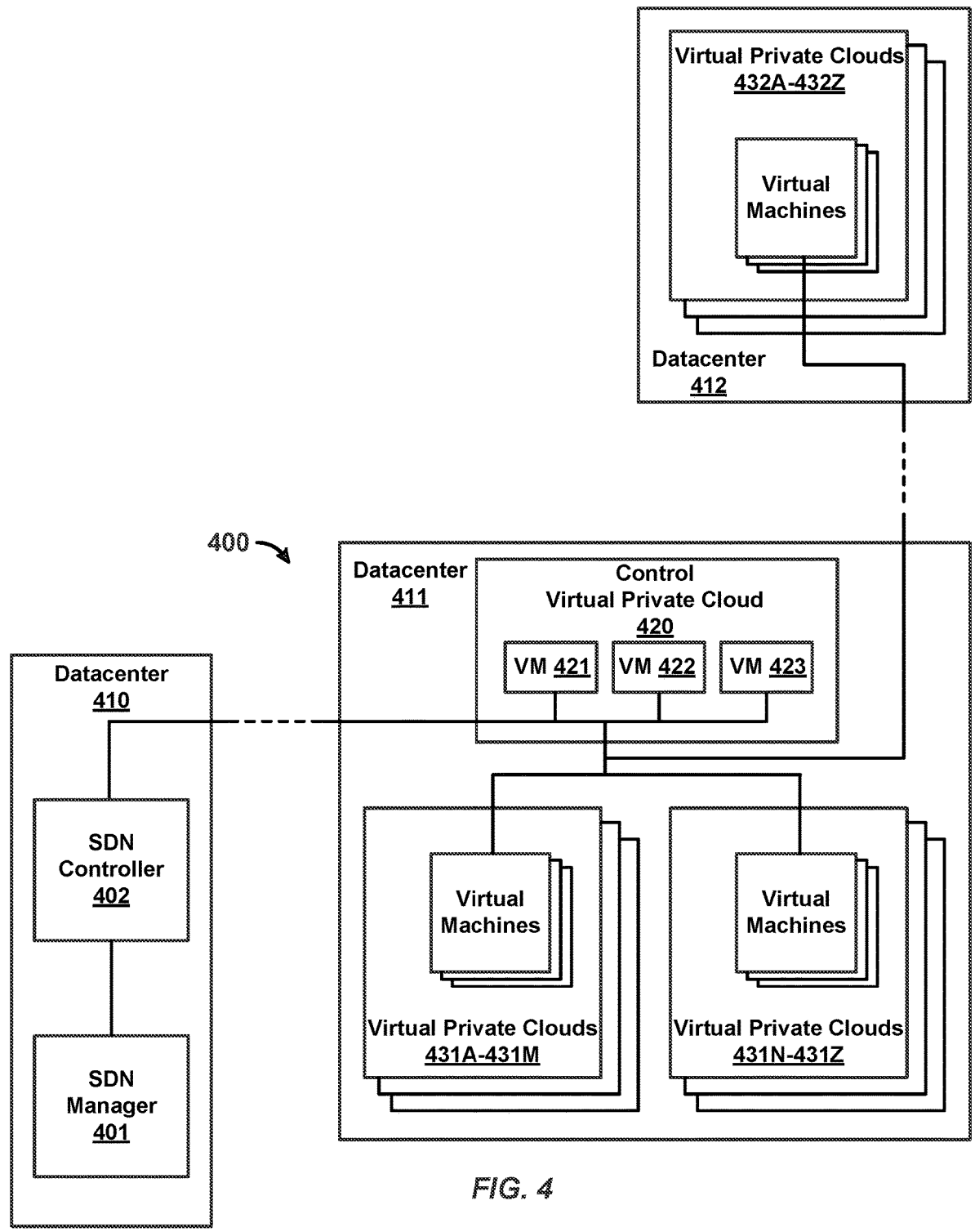
FIG. 4 illustrates an exemplary logical network deploying a plurality of proxy control planes in a control virtual private cloud.

In some situations, a logical network may be a sprawling network comprising numerous virtual private clouds deploying numerous virtual machines. For example, a network administrator that is a corporation may require a large network comprising hundreds of virtual private clouds (or more) deployed across one or more datacenters. FIG. 4 illustrates an exemplary logical network 400 implemented on a software-defined datacenter that includes a proxy control plane (within a control virtual private cloud) that has been horizontally scaled via sharding, in accordance with some embodiments. The software-defined datacenter of logical network 400 encompasses a private datacenter 410 deploying a SDN manager 401 (which establishes the policy rules) and a SDN controller 402 (which distributes the policy rules over the network). The software-defined datacenter of logical network 400 also encompasses a first public datacenter 411 and a second public datacenter 412 (e.g., within the same geographical region as first public datacenter 411).

First public datacenter 411 includes a control virtual private cloud 420 (operating as a central control gateway) deploying a proxy control plane(s) and that includes a plurality of virtual machines (e.g., virtual machines 421-423). Each proxy control plane may be a single virtual machine and/or a cluster of virtual machines operated by the isolated set of computing resources implementing control virtual private cloud 420.

First public datacenter 411 further includes a plurality of compute virtual private clouds 431A-431Z, with each compute virtual private cloud including a plurality of workload virtual machines (and/or workload containers). Similarly, second public datacenter 412 includes a plurality of compute virtual private clouds 432A-432Z, with each compute virtual private cloud including a plurality of workload virtual machines (and/or workload containers). As such, a proxy control plane implemented by a single virtual machine (e.g., virtual machine 421) of control virtual private cloud 420 may not have sufficient bandwidth and/or computing resources to manage all of the network traffic between the single virtual machine (e.g., virtual machine 421) of the proxy control plane and all of the workloads (e.g., of virtual private clouds 431A-431Z and 432A-432Z) deployed throughout the logical network.

In some embodiments, to address an insufficiency of bandwidth, the proxy control plane is horizontally scaled out to a plurality of virtual machines (e.g., virtual machines 421-423) or to a cluster of virtual machines. As such, in logical network 400, the handling of workloads of virtual private clouds 431A-431M, workloads of virtual private clouds 431N-431Z, and workloads of virtual private clouds 432A-432Z are partitioned among the multiple virtual machines (e.g., virtual machines 421-423) of control virtual private cloud 420 now implementing the proxy control plane, thereby alleviating network issues (e.g., a loss of network speed) that may arise from an overloaded control plane.

Figure 5:
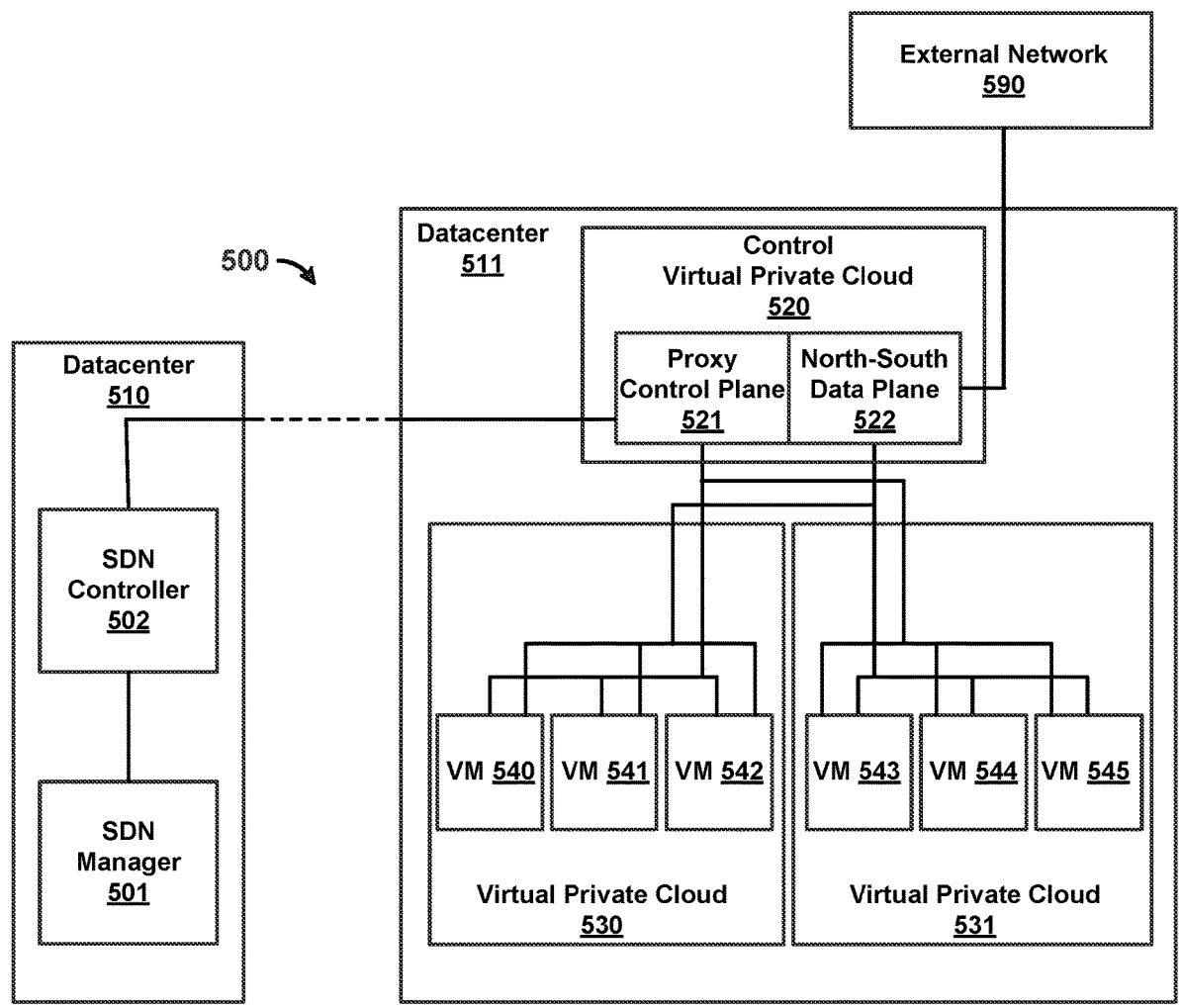
FIG. 5 illustrates an exemplary logical network deploying a proxy control plane and a north-south data plane in a control virtual private cloud.

As mentioned, compute virtual private clouds of a logical network may each include a north-south data plane(s), where a north-south data plane may be a single virtual machine or a cluster of virtual machines implemented by the isolated set of computing resources of its respective virtual private cloud. In some embodiments, together with a proxy control plane, a north-south data plane may also be pushed out from a compute virtual private cloud to a control virtual private cloud. FIG. 5 illustrates an exemplary logical network 500 implemented on a software-defined datacenter that includes a control virtual private cloud deploying a proxy control plane and a north-south data plane, in accordance with some embodiments. The software-defined datacenter of logical network 500 encompasses a private datacenter 510 deploying a SDN manager 501 (which establishes the policy rules) and a SDN controller 502 (which distributes the policy rules over the network). The software-defined datacenter of logical network 500 also encompasses a public datacenter 511 deploying a control virtual private cloud 520 and a plurality of compute virtual private clouds, including at least first virtual private cloud 530 and second virtual private cloud 531.

As shown in FIG. 5, control virtual private cloud 520 deploys a proxy control plane 521 and a north-south data plane 522. In some embodiments, control virtual private cloud 520 deploys one or more additional north-south data planes as standby north-south data planes. Neither first virtual private cloud 530 nor second virtual private cloud 531 locally includes a proxy control plane or a north-south data plane. Rather, workloads (e.g., of virtual machines 540-542) of first virtual private cloud 530 and workloads (e.g., of virtual machines 543-544) of second virtual private cloud 531 are (directly) in communication with each of central control plane 521 and north-south data plane 522 of control virtual private cloud 520. In some embodiments, north-south data plane 522 of control virtual private cloud 520 is also directly connected to an external network 590 via a different network tunnel.

In some situations, the deployment of a north-south data plane in a control virtual private cloud (operating as a central control gateway) may limit two-way communication between a virtual machine and the external network. For example, because of limitations enforced by the cloud service provider of public datacenter 511, return traffic coming in from external network 590 to control virtual private cloud 520 may be dropped by an internet gateway if the destination internet protocol (IP) address of the incoming traffic is not a public IP address associated with the receiving virtual private cloud (i.e., control virtual private cloud 520). Similarly, return traffic coming in from external network 590 via VPN can also be dropped by a VPN gateway if the destination IP address of the incoming traffic is not an IP address inside of the virtual private cloud (i.e., control virtual private cloud 520) where the VPN gateway resides.

In some embodiments, in order to overcome this problem caused by limitations placed by the cloud service provider on return network traffic, logical network 500 deploys an overlay mechanism when transmitting a packet out to the external network. Specifically, prior to pushing a packet (e.g., from a virtual machine of a compute virtual private cloud, such as virtual machine 540 of first virtual private cloud 530) out of control virtual private cloud 520 to external network 590, control virtual private cloud 520 performs an address translation on the packet (e.g., via a managed forwarding element of the proxy control plane managed by a local control plane agent). In some embodiments, the local control plane agent instructs the managed forwarding element to encapsulate the packet with a source IP address that corresponds to a local address of control virtual private cloud 520 (instead of an address of the originating compute virtual private cloud, such as virtual private cloud 530). Upon doing so, return traffic corresponding to the packet is permitted, by the cloud service provider, to enter logical network 500 (via control virtual private cloud 520) from external network 590. Upon receiving the return traffic, proxy control plane 521 of control virtual private cloud 520 decapsulates the return traffic and forwards the traffic to its intended destination virtual machine (e.g., virtual machine 540 of first virtual private cloud 530).

Figure 6:
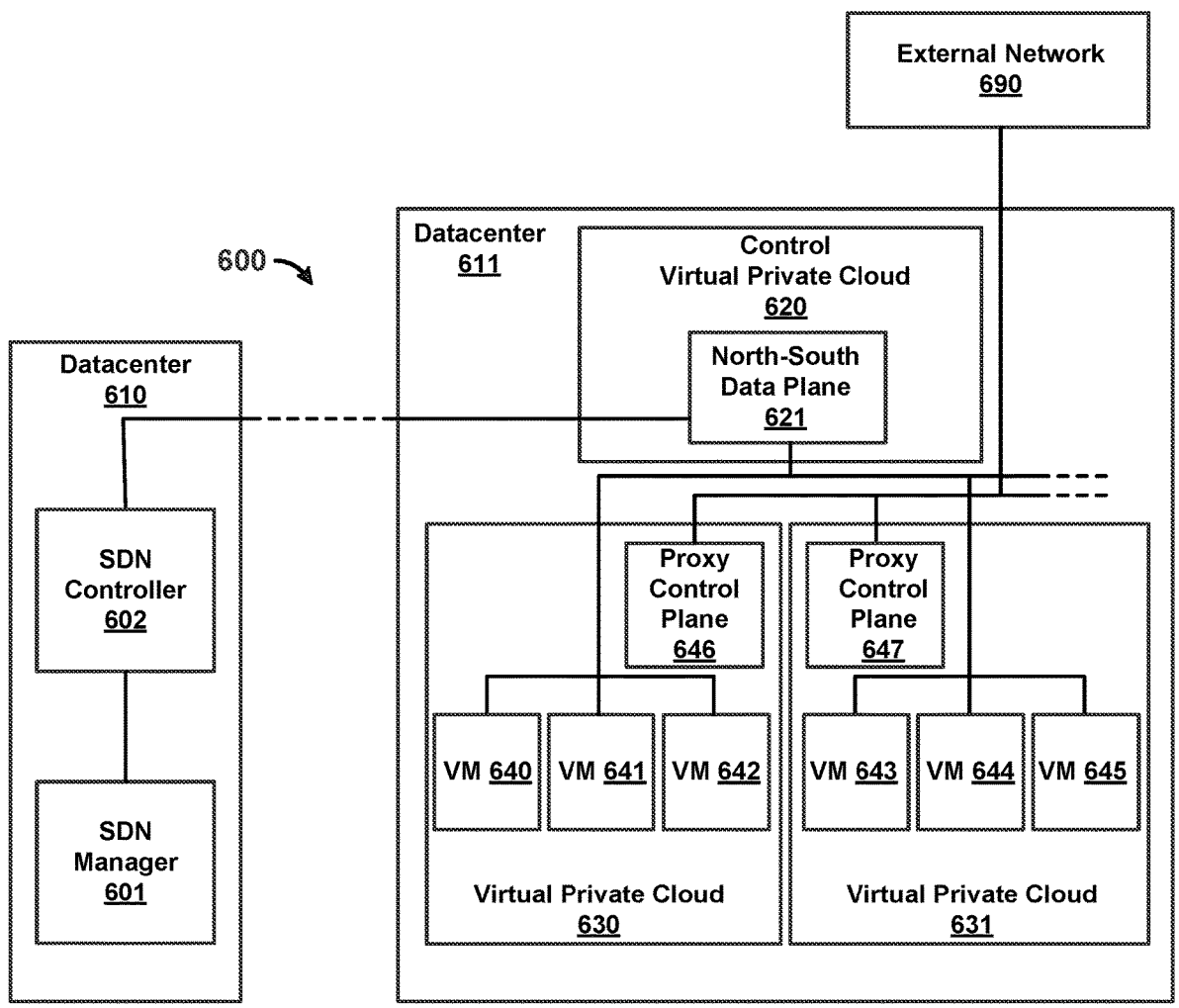
FIG. 6 illustrates an exemplary logical network deploying a north-south data plane in a control virtual private cloud and proxy control planes in compute virtual private cloud.

As mentioned, compute virtual private clouds of a logical network may each locally include a proxy control plane(s), where a proxy control plane is a single virtual machine or a cluster of virtual machines implemented by the isolated set of computing resources of its respective virtual private cloud. In some embodiments, while maintaining deployment of proxy control planes locally on compute virtual private clouds, north-south data planes are pushed out to a control virtual private cloud (e.g., a shared virtual private cloud). FIG. 6 illustrates an exemplary logical network 600 implemented on a software-defined datacenter that includes a control virtual private cloud 620 deploying a north-south data plane 621 that (directly) receive north-south network traffic from endpoints (e.g., virtual machines 640-642 and virtual machines 643-645) of the logical network, in accordance with some embodiments. In some embodiments, control virtual private cloud 620 includes one or more additional north-south data planes as standby north-south data planes. The software-defined datacenter of logical network 600 encompasses a private datacenter 610 SDN manager 601 (which establishes the policy rules) and a SDN controller 602 (which distributes the policy rules over the network). The software-defined datacenter of logical network 600 also encompasses a public datacenter 611 deploying control virtual private cloud 620 (e.g., a shared virtual private cloud operating as a central control gateway) and a plurality of compute virtual private clouds, including at least a first virtual private cloud 630 and a second virtual private cloud 631.

As shown in FIG. 6, first virtual private cloud 630 locally includes a proxy control plane 646 that directly controls its respective local virtual machines (e.g., virtual machines 640-642) and/or containers. Similarly, second virtual private cloud 631 locally includes a proxy control plane 647 that directly controls its respective local virtual machines (e.g., virtual machines 643-645) and/or containers.

In some embodiments, control virtual private cloud 620 (instead of compute virtual private clouds) deploys a north-south data plane(s) (e.g., north-south data plane 621) that is shared by virtual machines (e.g., virtual machines 640-642 and virtual machines 643-645) of a plurality of compute virtual private clouds (e.g., first virtual private cloud 630 and second virtual private cloud 631) of the logical network. In some embodiments, north-south data plane 621 is also directly connected to an external network 690 via a different network tunnel. In some embodiments (e.g., as described with reference to the proxy control plane in FIG. 4), north-south data plane 621 is horizontally scaled multiple virtual machines or a cluster of virtual machines (e.g., via sharding) to reduce overload on any single virtual machine implementing the north-south data plane.

By locally implementing proxy control planes (e.g., proxy control planes 646 and 647) within each compute virtual private cloud and centrally implementing a north-south data plane (e.g., north-south data plane 621) shared by virtual machines (and/or containers) across different virtual private clouds, the logical network provides isolation between compute virtual private clouds (e.g., between first virtual private cloud 630 and second virtual private cloud 631). One benefit of this isolation is enhanced security. For example, a malicious virtual machine may impact a proxy control plane locally implemented on its respective virtual private cloud. However, the malicious virtual machine can only impact dissemination of policies within its respective compute virtual private cloud—the malicious virtual machine cannot impact dissemination of policies in other compute virtual private clouds of the network.

Further, operating a north-south data plane typically requires a significant use of host computing resources (e.g., a cluster of virtual machines). For example, a network typically requires a larger virtual machine (or a larger cluster of virtual machines) to run a north-south data plane as opposed to a control plane. As such, implementing a north-south data plane centrally on a control virtual private cloud shared by a plurality of compute virtual private clouds across the network (as opposed to implementing a north-south data plane locally on each compute virtual private cloud) may provide the added benefit of requiring less use of host computing resources. This may in turn lead to further cost savings for the owner of the logical network, for the owner may be charged by the cloud service provider of a public datacenter based on the amount of host computing resources that are used by the network.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations.

What is claimed is:

1. A method for enforcing policies on virtual machines across virtual private clouds using a plurality of control virtual private clouds, each of the plurality of control virtual private clouds comprising a corresponding proxy control plane, the method comprising:
    at each of the proxy control planes of the plurality of control virtual private clouds, wherein each of the proxy control planes is directly in communication with at least two corresponding virtual machines on at least two corresponding virtual private clouds other than the plurality of control virtual private clouds, each of the virtual private clouds comprising a logically isolated set of resources having its own corresponding set of network policies:
        receiving, at the corresponding proxy control plane, a policy from a controller; and
        directly transmitting, from the corresponding proxy control plane, without passing any intermediary proxy control plane local to a first virtual private cloud of the at least two corresponding virtual private clouds and without passing any intermediary proxy control plane local to a second virtual private cloud of the at least two corresponding virtual private clouds, a first rule of the policy to a first virtual machine of the first virtual private cloud and a second rule of the policy to a second virtual machine of the second virtual private cloud;
    at the first virtual machine of the first virtual private cloud:
        receiving the first rule from the corresponding proxy control plane; and
        enforcing, via a first local control plane agent in the first virtual machine, the first rule at the first virtual machine;
    at the second virtual machine of the second virtual private cloud:
        receiving the second rule from the corresponding proxy control plane; and
        enforcing, via a second local control plane agent in the second virtual machine, the second rule at the second virtual machine.

2. The method of claim 1, wherein at least one of the proxy control planes is implemented by one or more virtual machines of the corresponding control virtual private cloud.

3. The method of claim 1, wherein at least one of the proxy control planes is implemented by a plurality of virtual machines of the corresponding control virtual private cloud.

4. The method of claim 1, wherein at least one of the proxy control planes is automatically horizontally scaled to a plurality of virtual machines of the corresponding control virtual private cloud in accordance with a determination that a number of virtual machines controlled by the at least one of the proxy control planes exceeds a predetermined number.

5. The method of claim 1, wherein the first rule and the second rule are the same rule of the policy.

6. The method of claim 1, wherein the corresponding control virtual private cloud of at least one of the proxy control planes is peered with the corresponding first virtual private cloud.

7. The method of claim 1, wherein the corresponding control virtual private cloud of at least one of the proxy control planes communicates with the corresponding first virtual private cloud via a virtual private network.

8. The method of claim 1, wherein:
    the corresponding control virtual private cloud of at least one of the proxy control planes includes a north-south data plane;
    the corresponding first virtual private cloud does not locally include ala north-south data plane; and
    the corresponding second virtual private cloud does not locally include any north-south data plane.

9. The method of claim 1, wherein:
    the corresponding control virtual private cloud of at least one of the proxy control planes includes a first north-south data plane;
    the corresponding first virtual private cloud locally includes a second north-south data plane; and
    the corresponding second virtual private cloud locally includes a third north-south data plane.

10. The method of claim 1, wherein the corresponding control virtual private cloud of at least one of the proxy control planes, the corresponding first virtual private cloud, and the corresponding second virtual private cloud are implemented on computing systems of a first datacenter.

11. The method of claim 1, wherein the corresponding control virtual private cloud of at least one of the proxy control planes is deployed on computing systems of a first datacenter and the corresponding first virtual private cloud is implemented on computing systems of a second datacenter different from the first datacenter.

12. The method of claim 1, wherein:
    a logical network is implemented on a software-defined datacenter that includes a first public datacenter, and
    the corresponding control virtual private cloud of at least one of the proxy control planes includes a cloud plugin configured to communicate with an application programming interface of a cloud service provider of the first public datacenter.

13. The method of claim 1, wherein the corresponding control virtual private cloud of at least one of the proxy control planes is implemented on a first public datacenter and the policy is received form a network controller implemented on a private datacenter different from the first public datacenter.

14. The method of claim 1, wherein the policy is a security policy.

15. One or more non-transitory computer-readable storage media storing one or more programs configured to be executed by one or more processors to enforce policies on virtual machines across virtual private clouds using a plurality of control virtual private clouds, each of the plurality of control virtual private clouds comprising a corresponding proxy control plane, the one or more programs including instructions for:
    at each of the proxy control planes of the plurality of control virtual private clouds, wherein each of the proxy control planes is directly in communication with at least two corresponding virtual machines on at least two corresponding virtual private clouds other than the plurality of control virtual private clouds, each of the virtual private clouds comprising a logically isolated set of resources having its own corresponding set of network policies:
  receiving, at the corresponding proxy control plane, a policy from a controller; and
  directly transmitting, from the corresponding proxy control plane, without passing any intermediary proxy control plane local to a first virtual private cloud of the at least two corresponding virtual private clouds and without passing any intermediary proxy control plane local to a second virtual private cloud of the at least two corresponding virtual private clouds, a first rule of the policy to a first virtual machine of the first virtual private cloud and a second rule of the policy to a second virtual machine of the second virtual private cloud;
at the first virtual machine of the first virtual private cloud:
  receiving the first rule from the corresponding proxy control plane; and
  enforcing, via a first local control plane agent in the first virtual machine, the first rule at the first virtual machine;
at the second virtual machine of the second virtual private cloud:
  receiving the second rule from the corresponding proxy control plane; and
  enforcing, via a second local control plane agent in the second virtual machine, the second rule at the second virtual machine.

16. The one or more non-transitory computer-readable storage media of claim 15, wherein at least one of the proxy control planes is implemented by one or more virtual machines of the corresponding control virtual private cloud.

17. The one or more non-transitory computer-readable storage media of claim 15, wherein at least one of the proxy control planes is automatically horizontally scaled to a plurality of virtual machines of the corresponding control virtual private cloud in accordance with a determination that a number of virtual machines controlled by the at least one of the proxy control planes exceeds a predetermined number.

18. The one or more non-transitory computer-readable storage media of claim 15, wherein:
  the corresponding control virtual private cloud of at least one of the proxy control planes includes a north-south data plane;
  the corresponding first virtual private cloud does not locally include any north-south data plane; and
  the corresponding second virtual private cloud does not locally include au north-south data plane.

19. A system for enforcing policies on virtual machines across virtual private clouds using a plurality of control virtual private clouds, each of the plurality of control virtual private clouds comprising a corresponding proxy control plane, the system comprising:
  one or more non-transitory memories storing executable instructions; and
  one or more processors configured to execute the instructions to cause the system to:
    at each of the proxy control planes of the plurality of control virtual private clouds, wherein each of the proxy control planes is directly in communication with at least two corresponding virtual machines on at least two corresponding virtual private clouds other than the plurality of control virtual private clouds, each of the virtual private clouds comprising a logically isolated set of resources having its own corresponding set of network policies:
      receive, at the corresponding proxy control plane, a policy from a controller; and
      directly transmit, from the corresponding proxy control plane, without passing any intermediary proxy control plane local to a first virtual private cloud of the at least two corresponding virtual private clouds and without passing any intermediary proxy control plane local to a second virtual private cloud of the at least two corresponding virtual private clouds, a first rule of the policy to a first virtual machine of the first virtual private cloud and a second rule of the policy to a second virtual machine of the second virtual private cloud;
    at the first virtual machine of the first virtual private cloud:
      receive the first rule from the corresponding proxy control plane; and
      enforce, via a first local control plane agent in the first virtual machine, the first rule at the first virtual machine;
    at the second virtual machine of the second virtual private cloud:
      receive the second rule from the corresponding proxy control plane; and
      enforce, via a second local control plane agent in the second virtual machine, the second rule at the second virtual machine.

20. The system of claim 19, wherein at least one of the proxy control planes is implemented by one or more virtual machines of the corresponding control virtual private cloud.

21. The system of claim 19, wherein at least one of the proxy control planes is automatically horizontally scaled to a plurality of virtual machines of the corresponding control virtual private cloud in accordance with a determination that a number of virtual machines controlled by the at least one of the proxy control planes exceeds a predetermined number.

22. The system of claim 19, wherein:
  the corresponding control virtual private cloud of at least one of the proxy control planes includes a north-south data plane;
  the corresponding first virtual private cloud does not locally include any north-south data plane; and
  the corresponding second virtual private cloud does not locally include au north-south data plane.

* * * * *